United States Patent
Kang et al.

(10) Patent No.: US 9,805,690 B2
(45) Date of Patent: Oct. 31, 2017

(54) DISPLAY DEVICE AND METHOD OF DRIVING THE SAME

(71) Applicant: LG Display Co., Ltd., Seoul (KR)

(72) Inventors: Seong Kyu Kang, Paju-si (KR); Hoon Bae Kim, Goyang-si (KR); Sung Su Han, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 172 days.

(21) Appl. No.: 14/537,526

(22) Filed: Nov. 10, 2014

(65) Prior Publication Data

US 2015/0161963 A1 Jun. 11, 2015

(30) Foreign Application Priority Data

Dec. 10, 2013 (KR) ........................ 10-2013-0152781

(51) Int. Cl.
*G06F 3/044* (2006.01)
*G09G 5/00* (2006.01)
*G06F 3/041* (2006.01)

(52) U.S. Cl.
CPC ............. *G09G 5/006* (2013.01); *G06F 3/044* (2013.01); *G06F 3/0412* (2013.01); *G06F 3/0416* (2013.01)

(58) Field of Classification Search
CPC ........ G06F 3/044; G06F 3/0362; G06F 3/016; G06F 3/0338; G09G 5/006
See application file for complete search history.

(56) References Cited

U.S. PATENT DOCUMENTS

| | | | |
|---|---|---|---|
| 2010/0328257 A1* | 12/2010 | Noguchi | G06F 3/044 345/174 |
| 2011/0148435 A1 | 6/2011 | Schwartz et al. | |
| 2011/0261007 A1 | 10/2011 | Joharapurkar et al. | |
| 2013/0038570 A1 | 2/2013 | Seo et al. | |
| 2013/0241868 A1 | 9/2013 | Kim et al. | |
| 2013/0293498 A1 | 11/2013 | Kim et al. | |
| 2013/0307820 A1 | 11/2013 | Kim | |
| 2014/0028616 A1* | 1/2014 | Furutani | G06F 3/044 345/174 |
| 2014/0152324 A1* | 6/2014 | Schwartz | G06F 3/0416 324/658 |
| 2014/0198268 A1* | 7/2014 | Sugita | G06F 3/044 349/12 |
| 2014/0375598 A1* | 12/2014 | Shen | G06F 3/044 345/174 |

* cited by examiner

*Primary Examiner* — Carolyn R Edwards
(74) *Attorney, Agent, or Firm* — Fenwick & West LLP

(57) ABSTRACT

A disclosed display device includes a touch panel including s number of receiving electrodes and k number of driving electrodes which are formed to intersect the receiving electrodes, k being less than s and larger than 2, the touch panel provided in an in-cell type. The display device further includes a touch sensing unit configured to respectively supply a first driving voltage and a second driving voltage to an nth driving electrode and an (n+1)th driving electrode, which are adjacent to each other among the driving electrodes, to determine whether the nth driving electrode is touched, n being a natural number which is more than one and less than k, the touch sensing unit further configured to respectively supply the first driving voltage and the second driving voltage to a kth driving electrode and a (k−1)th driving electrode to determine whether the kth driving electrode is touched.

21 Claims, 9 Drawing Sheets

(a)

(b)　　　　　　　　(c)

DISPLAY DEVICE AND METHOD OF DRIVING THE SAME

CROSS-REFERENCE TO RELATED APPLICATIONS

This application claims the benefit of the Korean Patent Application No. 10-2013-0152781 filed on Dec. 10, 2013, which is hereby incorporated by reference as if fully set forth herein.

BACKGROUND

Field of the Invention

The present invention relates to a display device and a method of driving the same, and more particularly, a display device including a touch panel and a method of driving the same.

Discussion of the Related Art

A touch panel is a type of input device that is included in display devices such as liquid crystal display (LCD) devices, plasma display panels (PDPs), organic light emitting display device (OLED), and electrophoretic displays (EPDs), and enables a user to input information by directly touching a screen with a finger, a pen or the like while looking at the screen of the display device.

A touch panel may be manufactured independently from a panel configuring a display device, and then may be attached to an upper end surface of the panel or may be provided as one body with the panel.

For example, the touch panel may be categorized into an in-cell type in which the touch panel is built into a pixel of the panel displaying an image, an on-cell type in which the touch panel is provided on the panel, and an add-on type in which the touch panel is manufactured independently from the panel and then is attached to an upper end of the panel.

An in-cell type touch panel may be more aesthetic and slimmer, and thus application of the in-cell type touch panel has expanded. That is, the demand for an in-cell type display device, in which elements configuring a touch panel are built into a panel to reduce the thickness of portable terminals such as smart phones and tablet personal computers (PCs), is increasing.

FIG. 1 is an exemplary diagram for describing a related art method of driving a touch panel, and FIG. 2 is an exemplary diagram for describing a related art method of sensing a touch in a touch panel.

A touch panel senses a user's touch, and may be implemented in various types such as a resistive type and a capacitive type. Hereinafter, a touch panel using the capacitive type will be described with reference to FIG. 1.

A below-described touch panel 10 is an in-cell type touch panel, and is supplied with a driving voltage. The touch panel 10 includes a plurality of driving electrodes TX, which are formed in parallel with a plurality of gate lines formed in a panel into which the touch panel 10 is built, and a plurality of receiving electrodes RX which transfer a plurality of sensing signals, generated by the driving voltage, to a touch sensing unit. The touch sensing unit includes a driver, which supplies the driving voltage to the driving electrodes TX, and a receiver which determines whether there is a touch, by using the sensing signals received from the receiving electrodes.

In a related art display device including the touch panel 10, in order to determine whether the touch panel 10 is touched, the driving voltage is sequentially supplied to the driving electrodes TX, and the sensing signals are received from all the receiving electrodes RX while the driving voltage is applied to the driving electrodes TX.

The sensing signal corresponds to a capacitance which is generated between the driving electrode TX and the receiving electrode RX by the driving voltage, and the touch sensing unit analyzes an amount of change in the capacitance to determine whether the touch panel 10 is touched.

In an in-cell type display device, the driving electrodes TX and the receiving electrodes RX perform a function of a common electrode which is formed in a pixel formed in the panel and is supplied with a common voltage.

Therefore, during an image display period, the driving electrode TX and the receiving electrode RX perform the function of the common electrode which receives the common voltage supplied to the pixel. Also, during a touch sensing period, the touch sensing unit supplies the driving voltage to the driving electrode TX, and determines whether the touch panel is touched, by using the sensing signal received from the receiving electrode.

For example, in order to drive the related art in-cell type display device, a period (hereinafter simply referred to as one frame period) corresponding to one frame is divided into the image display period and the touch sensing period.

During the image display period, the common voltage is supplied to the driving electrodes TX and the receiving electrodes RX. During the touch sensing period, a pulse-type driving voltage is supplied to the driving electrodes TX, and the sensing signals are transferred from the receiving electrodes RX to the touch sensing unit.

In the touch panel applied to the in-cell type display device, the driving electrodes TX and the receiving electrodes RX are formed on the same plane, where a distance between adjacent electrodes may be short, and the electrodes are formed in the pixel. Therefore, a capacitance generated between the driving electrodes TX and the receiving electrodes RX may be large.

A display device including the touch panel 10 may be applied to small electronic devices such as smartphones, tablet personal computers (PCs), notebook computers, monitors, etc. Therefore, parasitic capacitance may not greatly affect the sensing performance for small electronic devices.

However, the touch panel 10 may be applied to large display devices such as large televisions (TVs), large monitors, and electronic bulletin boards. In this case, the number of parasitic capacitors exponentially increases, and thus, the parasitic capacitance increases. When the parasitic capacitance increases, a load of the receiving electrode RX increases, and for this reason, a sensing performance of the touch sensing unit is degraded. That is, when the related art in-cell type touch panel is applied to a large display device having a large area as-is, the load of the receiving electrode RX increases due to the parasitic capacitance, and for this reason, the sensing performance of the touch sensing unit is degraded.

Moreover, in the related art in-cell type touch panel using a differential driving method, a first driving voltage and a second driving voltage are respectively supplied to two adjacent driving electrodes TX, and then whether one of the two driving electrodes TX is touched is determined by comparing a plurality of sensing signals received from the receiving electrodes RX. For example, as illustrated in FIGS. 1 and 2, when four driving electrodes TX1 to TX4 are formed in the touch panel 10 in parallel with the gate lines, during a first touch sensing period, the touch sensing unit supplies the first driving voltage to a first driving electrode TX1, supplies the second driving voltage to a second driving electrode TX2, and analyzes levels of the sensing signals received from the receiving electrodes RX to determine whether the first driving electrode TX1 is touched. Also, during a third touch sensing period, the touch sensing unit supplies the first driving voltage to a third driving electrode TX3, supplies the second driving voltage to a fourth driving electrode TX4, and analyzes levels of the sensing signals received from the receiving electrodes RX to determine whether the third driving electrode TX3 is touched. However, when a lowermost driving electrode TX4 which is formed at a lowermost portion of the touch panel among the driving electrodes TX is touched, there is no driving electrode TX which is compared with the lowermost driving electrode TX4. Therefore, in order to determine whether the lowermost driving electrode TX4 is touched, as illustrated in FIG. 2, a sensing signal generated from the second driving voltage which is applied to an additional driving electrode TXa which is not formed in a display area of the touch panel is used, a sensing signal generated from the second driving voltage which is applied to an uppermost driving electrode TX1 which is formed at a position opposite to the lowermost driving electrode TX4 is used, or an arbitrary sensing signal is used. Therefore, whether the lowermost driving electrode TX4 is touched may be inaccurately determined.

SUMMARY

Accordingly, the present invention relates to a display device including a touch panel and a method of driving the same that substantially obviate one or more problems due to limitations and disadvantages of the related art.

An aspect of the present invention relates to a display device and a method of driving the same which, when whether an outermost driving electrode is touched is determined by using a differential driving method, change a driving voltage supplied to the outermost driving electrode, and a driving voltage supplied to another driving electrode adjacent to the outermost driving electrode.

Another aspect of the present invention relates to a display device and a method of driving the same which, when whether an outermost driving electrode of a first touch electrode group is touched is determined by using a differential driving method, supply a driving voltage to a driving electrode which is adjacent to the outermost driving electrode of the first touch electrode group, and constitutes a second touch electrode group.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a touch panel including s number of receiving electrodes and k number of driving electrodes which are formed to intersect the receiving electrodes, k being less than s and larger than 2, the touch panel provided in an in-cell type; and a touch sensing unit configured to respectively supply a first driving voltage and a second driving voltage to an nth driving electrode and an (n+1)th driving electrode, which are adjacent to each other among the driving electrodes, to determine whether the nth driving electrode is touched, n being a natural number which is more than one and less than k, the touch sensing unit further configured to respectively supply the first driving voltage and the second driving voltage to a kth driving electrode and a (k−1)th driving electrode to determine whether the kth driving electrode is touched.

In another aspect of the present invention, there is provided a display device including: a touch panel including a first touch electrode group in which s number of receiving electrodes and k number of driving electrodes are formed to intersect each other and a second touch electrode group in which s number of other receiving electrodes and (k+1)th to (2k)th driving electrodes are formed to intersect each other, k being less than s, the touch panel is provided in an in-cell type, the receiving electrodes in the first touch electrode group electrically disconnected from said other receiving electrodes in the second touch electrode group; and a touch sensing unit configured to respectively supply a first driving voltage and a second driving voltage to an nth driving electrode and an (n+1)th driving electrode in each of the first and second touch electrode groups to determine whether the nth driving electrode is touched, n being a natural number less than k, the touch sensing unit further configured to respectively supply the first driving voltage and the second driving voltage to a kth driving electrode configuring the first touch electrode group and a (k+1)th driving electrode configuring the second touch electrode group to determine whether the kth driving electrode is touched.

In another aspect of the present invention, there is provided a method of driving a display device including: respectively supplying a first driving voltage and a second driving voltage to an nth driving electrode and an (n+1)th driving electrode, which are adjacent to each other among k number of driving electrodes which are formed to intersect s number of receiving electrodes in a touch panel which is provided in an in-cell type in a panel, to determine whether the nth driving electrode is touched, k being less than s and larger than 2, n being a natural number which is more than one and less than k; and respectively supplying the first driving voltage and the second driving voltage to a kth driving electrode and a (k−1)th driving electrode to determine whether the kth driving electrode is touched.

In another aspect of the present invention, there is provided a method of driving a display device including: respectively supplying a first driving voltage and a second driving voltage to an nth driving electrode and an (n+1)th driving electrode which are adjacent to each other in each of a first touch electrode group and a second touch electrode group, the first touch electrode group having s number of receiving electrodes and k number of driving electrodes to intersect each other which are formed in a touch panel, k being less than s and n being a natural number less than k, and the second touch electrode group having s number of other receiving electrodes and (k+1)th to (2k)th driving electrodes to intersect each other in the touch panel, the receiving electrodes in the first touch electrode group electrically disconnected from said other receiving electrodes in the second touch electrode group; and respectively supplying a kth driving electrode configuring the first touch electrode group and a (k+1)th driving electrode configuring the second touch electrode group to determine whether the kth driving electrode is touched.

Another aspect of the invention concerns a display device including a touch panel including receiving electrodes and driving electrodes including at least a first driving electrode, a second driving electrode, and a third driving electrode. The receiving electrodes intersect the first, second, and third driving electrodes. The display device also includes a touch sensing unit. The touch sensing unit is configured to supply a first driving voltage to the first driving electrode and a second driving voltage to the second driving electrode to determine whether the first driving electrode is touched, where the second driving electrode is adjacent to the first driving electrode. The touch sensing unit is also configured to supply the first driving voltage to the second driving electrode and the second driving voltage to the third driving electrode to determine whether the second driving electrode is touched, where the third driving electrode is adjacent to the second driving electrode. The touch sensing unit is further configured to supply the first driving voltage to the third driving electrode and the second driving voltage to the second driving electrode to determine whether the third driving electrode is touched.

Another aspect of the invention concerns a method of driving a touch panel. The method includes supplying a first driving voltage to a first driving electrode and a second driving voltage to a second driving electrode to determine whether the first driving electrode is touched, where the second driving electrode is adjacent to the first driving electrode. The method also includes supplying the first driving voltage to the second driving electrode and the second driving voltage to a third driving electrode to determine whether the second driving electrode is touched, where the third driving electrode is adjacent to the second driving electrode. In addition, the method also includes supplying the first driving voltage to the third driving electrode and the second driving voltage to the second driving electrode to determine whether the third driving electrode is touched. The first, second and third driving electrodes intersect receiving electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
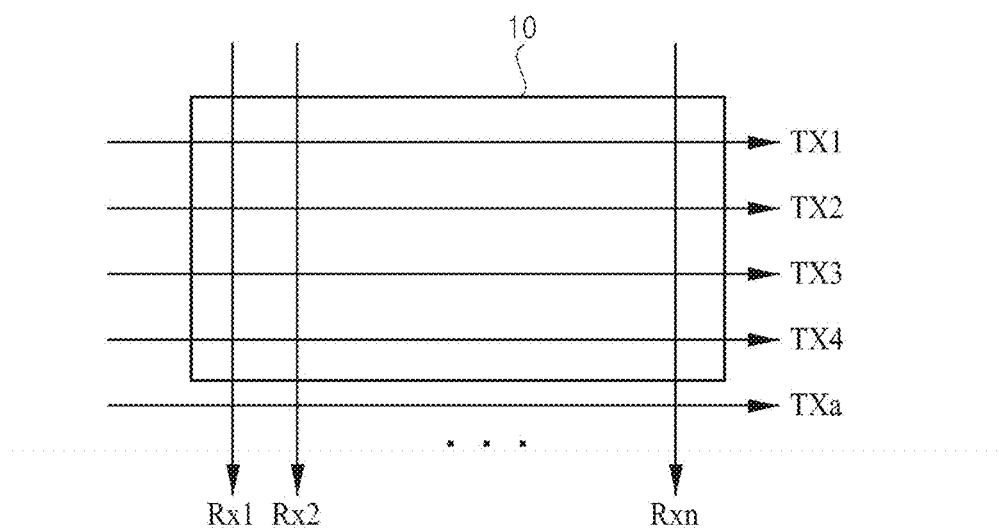
FIG. 1 is an exemplary diagram for describing a related art method of driving a touch panel.
Figure 2:
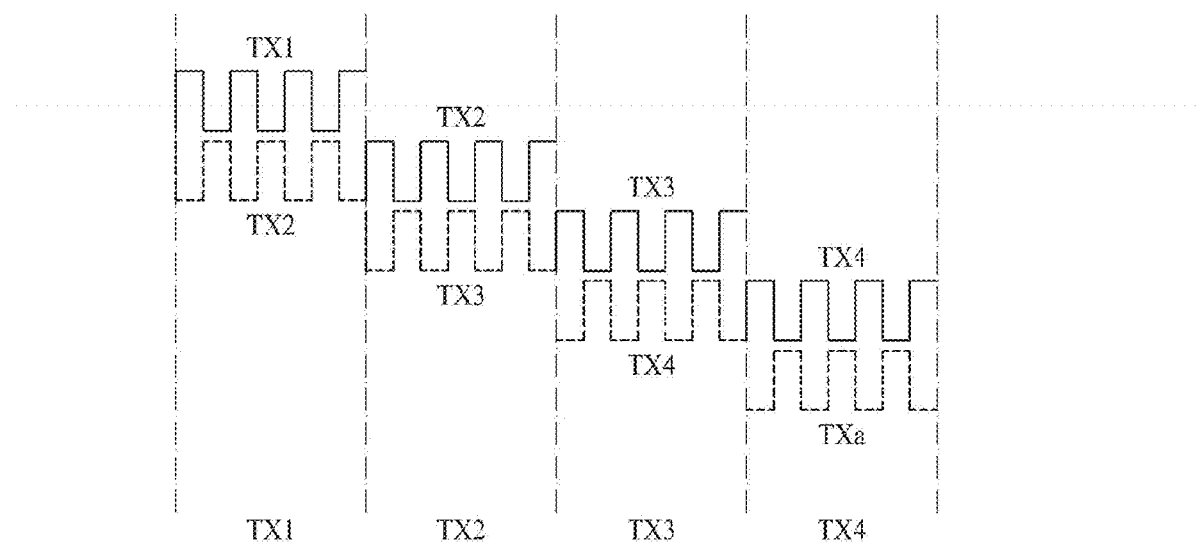
FIG. 2 is an exemplary diagram for describing a related art method of sensing a touch in a touch panel.
Figure 3:
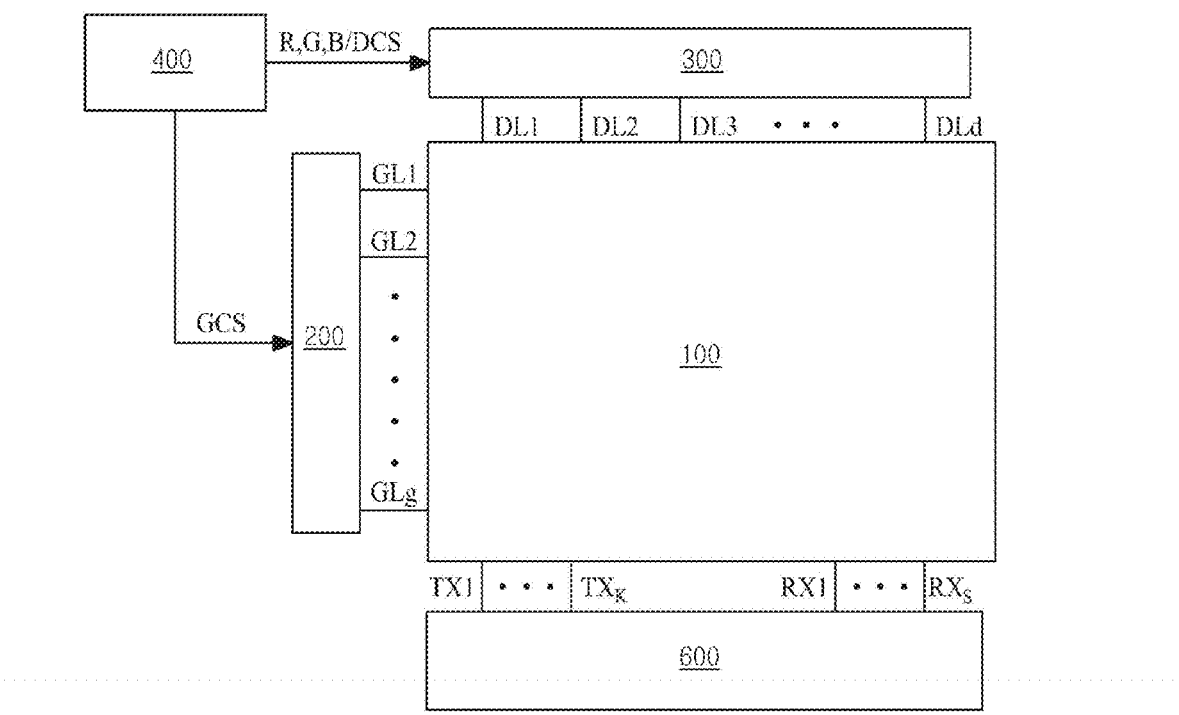
FIG. 3 is a diagram illustrating a configuration of a display device according to an embodiment of the present invention.

FIG. 3 is a diagram illustrating a configuration of a display device according to an embodiment of the present invention.

The display device according to an embodiment of the present invention, as illustrated in FIG. 3, includes: a panel 100 in which a touch panel where a plurality of receiving electrodes RX1 to RXs and a plurality of driving electrodes TX1 to TXk are formed to intersect each other is built in an in-cell type; a touch sensing unit 600 which determines the touch panel is touched, by using a differential driving method which supplies a first driving voltage and a second driving voltage to two adjacent driving electrodes TX during a plurality of touch sensing periods included in one frame period; and a panel driver which drives the panel 100 in order for the panel 100 to display an image.

The panel 100 may be a liquid crystal panel, an organic light emitting panel, a plasma display panel, or an electrophoretic display panel. The panel 100 is manufactured by bonding a first substrate to a second substrate through a bonding process. An intermediate layer is formed between the first substrate and the second substrate.

The first substrate and the second substrate may be formed of glass, plastic, or metal.

The intermediate layer may include different configurations depending on the kind of the display device according to an embodiment of the present invention. For example, when the display device is an LCD device, the intermediate layer may include liquid crystal. When the display device is an organic light emitting display device, the intermediate layer may include an organic compound that emits light. When the display device is a PDP device, the intermediate layer may include an inert gas. When the display device is an EPD device, the intermediate layer may include e-ink.

Hereinafter, for convenience of description, a case in which the panel 100 is the liquid crystal panel will be described as an example of the present invention. That is, the present invention may be applied to various kinds of display devices in which a common electrode receiving a common voltage is formed in all pixels. Hereinafter, an LCD device will be described as an example of the present invention.

When the panel 100 is the liquid crystal panel, the panel 100 includes a first substrate, a second substrate, and a liquid crystal layer which is formed between the first substrate and the second substrate.

The first substrate of the panel 100 may be a thin film transistor (TFT) substrate. A plurality of data lines DL1 to DLd, a plurality of gate lines GL1 to GLd intersecting the data lines DL1 to DLd, a plurality of TFTs which are respectively formed in a plurality of pixels formed in intersection areas between the data lines DL1 to DLd and the gate lines GL1 to GLd, and a plurality of pixel electrodes for charging a data voltage into a corresponding pixel are formed on the first substrate. That is, the plurality of pixels are arranged in a matrix type due to an intersection structure between the data lines DL1 to DLd and the gate lines GL1 to GLd.

The second substrate of the panel 100 may be a color filter substrate. A black matrix (BM) and a color filter may be formed on the second substrate.

A display area in which an image is displayed and a non-display area in which an image is not displayed are formed in the panel 100. The plurality of pixels formed by intersections between the data lines and the gate lines are formed in the display area.

The display area and the non-display area which are formed in the panel 100 are respectively formed at positions corresponding to a display area and a non-display area of the touch panel.

The touch panel includes the plurality of receiving electrodes RX1 to RXs and the plurality of driving electrodes TX1 to TXk.

The touch panel may be a capacitive type, and is built into the panel 100. That is, the touch panel may be an in-cell type touch panel.

The receiving electrodes RX1 to RXs and the driving electrodes TX1 to TXk are formed to intersect each other in the panel 100.

In a period (hereinafter simply referred to as one frame period) corresponding to one frame, the common voltage is supplied to the receiving electrodes RX and the driving electrodes TX during an image display period. During a touch sensing period of one frame period, a first driving voltage or a second driving voltage is sequentially supplied to the driving electrodes TX, and a plurality of sensing signals are received from the receiving electrodes RX.

That is, in the display device according to an embodiment of the present invention, the image display period and touch sensing period of one frame period are repeated a number of times corresponding to the number of the receiving electrodes RX.

During a plurality of the touch sensing periods included in one frame period, the touch sensing unit 600 determines whether the driving electrodes TX are touched, by using the sensing signals received from the receiving electrodes RX.

To this end, the touch sensing unit 600 includes a driver, which outputs the first driving voltage or the second driving voltage to the driving electrodes TX, and a receiver that receives the sensing signals from the receiving electrodes RX.

In particular, by using the differential driving method described in the background, the touch sensing unit 600 determines whether the touch panel is touched.

For example, the touch sensing unit 600 using the differential driving method supplies the first driving voltage and the second driving voltage to two adjacent driving electrodes, and compares a plurality of sensing signals received from the two receiving electrodes RX to determine whether one of the two driving electrodes is touched. The first driving voltage and the second driving voltage may have the same level, and have different polarities or phases.

The panel driver, as illustrated in FIG. 3, includes at least one selected from a timing controller 400, a gate driver 200, and a data driver 300.

First, the first timing controller 400 receives a timing signal, including a data enable signal (DE) and a dot clock (CLK), from an external system to generate control signals GCS and DCS for controlling operation timings of the data driver 300 and the gate driver 200. Also, the timing controller 400 realigns input image data received from the external system to output the realigned image data to the data driver 300.

Moreover, the timing controller 400 may control the data driver 300 and the gate driver 200, and generate control signals, used to control an operation timing of the touch sensing unit 600, to control the touch sensing unit 600.

In order to perform the above-described function, the timing controller 400 includes a receiver that receives the input image data and the timing signals from the external system, a control signal generator that generates various control signals, a data aligner that realigns the input image data to output the realigned image data, and an output unit that outputs the control signals and the image data.

Second, the data driver 300 converts the image data, input from the timing controller 400, into analog data voltages, and supplies, to the data lines, data voltages for one horizontal line at every one horizontal period where a scan signal is supplied to a corresponding gate line. That is, the data driver 300 converts the image data into the data voltages by using gamma voltages supplied from a gamma voltage generator (not shown), and outputs the data voltages to the data lines.

The data driver 300 shifts a source start pulse (SSP) from the timing controller 400 according to a source shift clock (SSC) to generate a sampling signal. The data driver 300 latches image data RGB, which is input according to the source shift clock (SSC), according to the sampling signal to convert the image data into data voltages, and supplies the data voltages to the data lines in units of a horizontal line in response to the source output enable signal (SOE).

To this end, the data driver 300 may include a shift register, a latch, a digital-to-analog converter (DAC), and an output buffer.

Third, the gate driver 200 shifts a gate start pulse (GSP), transferred from the timing controller 400, according to a gate shift clock (GSC) to sequentially supply a gate-on voltage (Von) to the gate lines GL1 to GLg. The gate driver 200 supplies a gate-off voltage (Voff) to the gate lines GL1 to GLg during the other period where a scan signal of the gate-on voltage is not supplied.

The gate driver 200 applied to the present invention may be manufactured independently from the panel 100, and may be electrically connected to the panel 100 in various types. However, the gate driver 200 may be provided in a gate-in panel (GIP) type where the gate driver 200 is built into the panel 100.

Moreover, the data driver 300, the gate driver 200, and the timing controller 400 have been described above as being provided independently from each other, but one of the data driver 300 and the gate driver 200 may be provided with the timing controller 400 in a single component.

Hereinafter, a display device and a method of driving the same according to a first embodiment of the present invention will be described in detail with reference to FIGS. 4 to 6.

Figure 4:
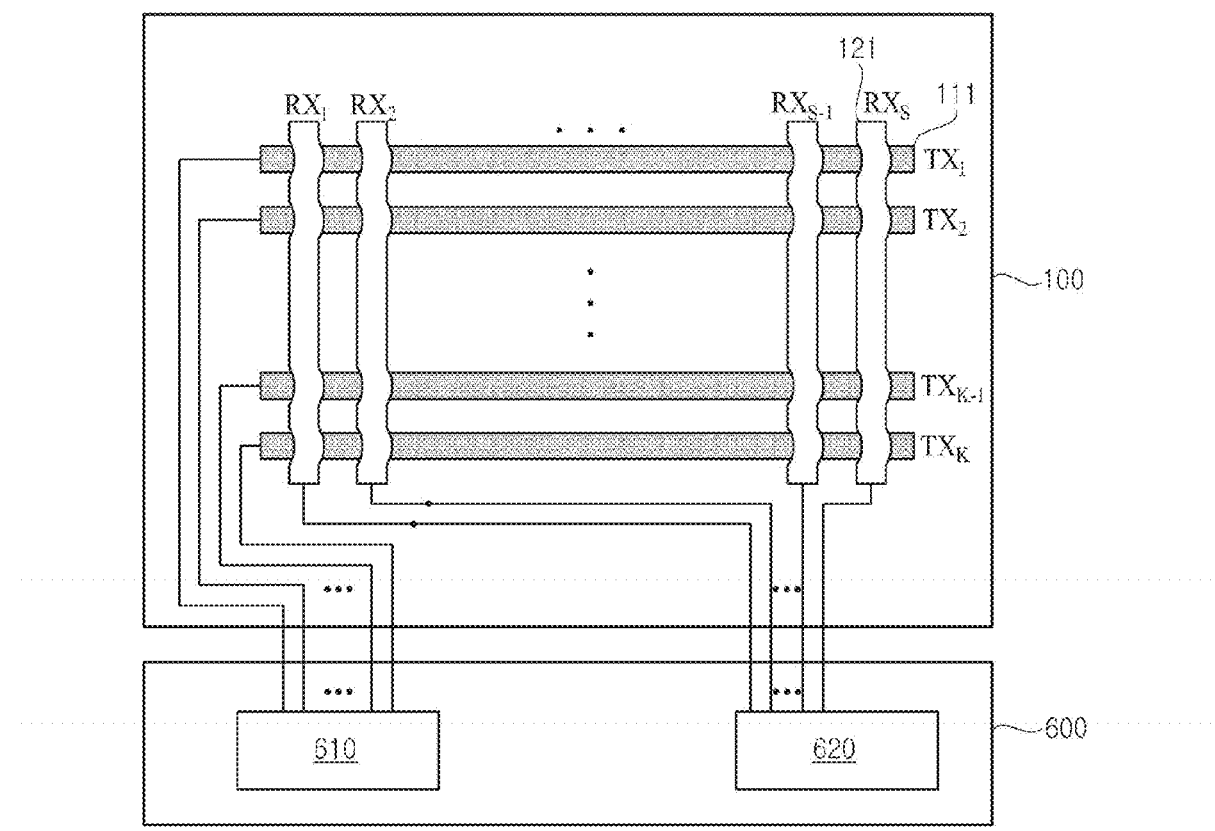
FIG. 4 is an exemplary diagram illustrating configurations of a panel and a touch sensing unit applied to a display device according to a first embodiment of the present invention.

FIG. 4 is an exemplary diagram illustrating configurations of a panel and a touch sensing unit applied to a display device according to a first embodiment of the present invention. FIG. 5 is an exemplary diagram showing waveforms of driving voltages applied to a display device according to a first embodiment of the present invention. FIG. 6 is an exemplary diagram illustrating an internal configuration of a touch sensing unit 600 applied to a display device according to a first embodiment of the present invention.

The display device according to the first embodiment of the present invention, as illustrated in FIG. 4, includes: a panel 100 in which a touch panel, including s number of receiving electrodes (RX1 to RXs) 121 and k (which may be less than s and larger than 2) number of driving electrodes (TX1 to TXk) 111 which are formed to intersect the receiving electrodes 121, is provided in an in-cell type; a touch sensing unit 600 which respectively supplies a first driving voltage DV1 and a second driving voltage DV2 to an nth (where n is a natural number which is more than one and less than k) driving electrode and an (n+1)th driving electrode, which are adjacent to each other among the driving electrodes 111, to determine whether the nth driving electrode is touched, and respectively supplies the first driving voltage DV1 and the second driving voltage DV2 to a kth driving electrode TXk and a (k−1)th driving electrode TXk−1 to determine whether the kth driving electrode TXk is touched, where the kth driving electrode TXk is positioned nearest to an edge of the touch panel among the driving electrodes TX; and a plurality of panel drivers 200, 300 and 400 which drive the panel 100 in order for the panel 100 to display an image. Configurations of the panel drivers 200, 300 and 400 have been described above, and thus, their detailed descriptions are not provided.

As illustrated in FIG. 4, the s receiving electrodes (RX1 to RXs) 121 which are formed in parallel with the gate lines GL1 to GLg and the k (which may be less than s and larger than 2) driving electrodes (TX1 to TXk) 111 are formed to intersect each other in the panel 100.

Here, the driving electrodes TX1 to TXk are formed in parallel with the gate lines GL1 to GLg which are formed in the panel 100. That is, as illustrated in FIG. 4, the driving electrodes TX1 to TXk are formed in a width direction of the panel 100.

In the following description, a case where the number of the receiving electrodes 121 is 27 (e.g., s=27) and the number of the driving electrodes 111 is 24 (e.g., k=24) will be described as an example of the present invention.

The image display periods and the touch sensing periods are repeated in one frame period.

During the image display periods, a common voltage is supplied to the driving electrodes 111 and the receiving electrodes 121. In this case, the driving electrodes 111 and the receiving electrodes 121 perform a function of common electrodes.

Figure 5:
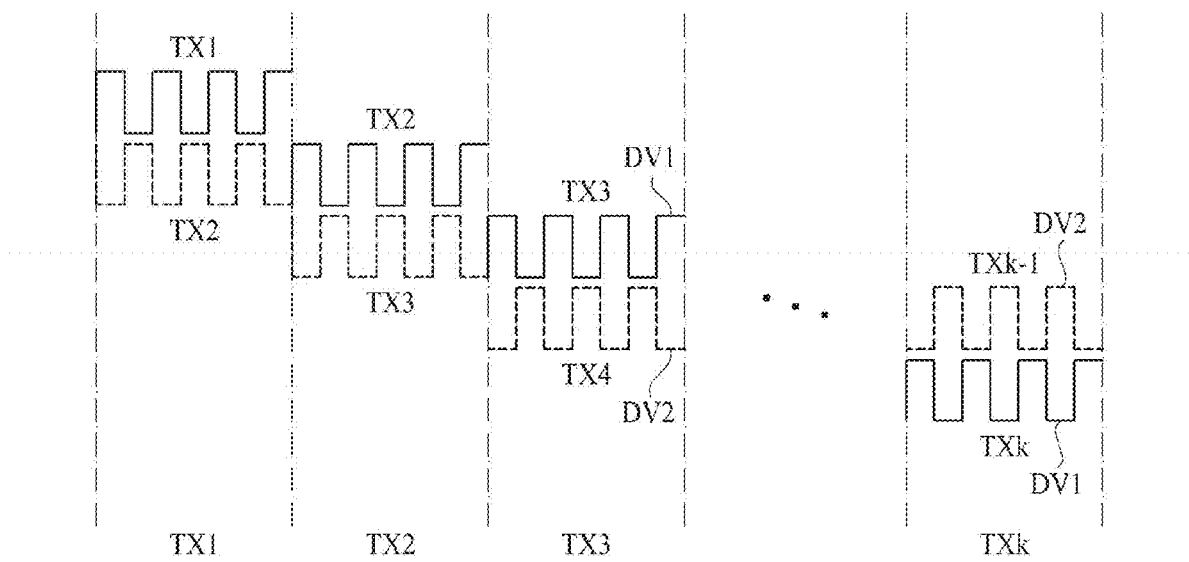
FIG. 5 is an exemplary diagram showing waveforms of driving voltages applied to a display device according to a first embodiment of the present invention.

During each of the touch sensing periods, as illustrated in FIG. 5, the touch sensing unit 600 supplies the first driving voltage DV1 and the second driving voltage DV2 to two adjacent driving electrodes 111, and analyzes a plurality of sensing signals received from the receiving electrodes 121 to determine whether a driving electrode, receiving the first driving voltage DV1, of the two driving electrodes is touched.

For example, the touch sensing unit 600 respectively supplies the first driving voltage DV1 and the second driving voltage DV2 to the nth (where n is a natural number which is more than one and less than k) driving electrode and the (n+1)th driving electrode, which are adjacent to each other among the driving electrodes 111, to determine whether the nth driving electrode is touched, and respectively supplies the first driving voltage DV1 and the second driving voltage DV2 to the kth driving electrode TXk and the (k−1)th driving electrode TXk−1 to determine whether the kth driving electrode TXk is touched. Here, n is a natural number which is more than one and less than k.

First, referring to FIG. 5, when n is three, during a third touch sensing period (Touch #3), the touch sensing unit 600 supplies the first driving voltage DV1 to a third driving electrode TX3, and supplies the second driving voltage DV2 to a fourth driving electrode TX4.

The touch sensing unit 600 analyzes a plurality of sensing signals received from first to 27th receiving electrodes RX1 to RX27 according to the first driving voltage DV1 and the second driving voltage DV2 to determine whether the third driving electrode TX3 is touched. For example, when the third driving electrode TX3 is not touched and two different voltages having substantially the same level and different polarities are used as the first driving voltage and the second driving voltage, levels or waveforms of a plurality of sensing signals generated from the two voltages are substantially the same in all the plurality of receiving electrodes or are within a certain range. However, when the third driving electrode TX3 is touched, a sensing signal received from a receiving electrode which is formed in a touched area among the plurality of receiving electrodes has a value different from values of sensing signals from the other receiving electrodes. Therefore, the touch sensing unit 600 may analyze the amount of changes in the sensing signals to determine whether the third driving electrode TX3 is touched.

In this case, whether each of the first to 23rd driving electrodes TX1 to TX23 is touched may be determined by the above-described method.

Second, during a first touch sensing period (Touch #1) to a 23rd touch sensing period (Touch #23), whether each of the first to 23rd driving electrodes TX1 to TX23 is touched may be determined by the above-described method.

However, in a conventional approach, when determining whether a 24th driving electrode TX24 (which is a last driving electrode) is touched, there is no driving electrode TX to which the second driving voltage can be supplied. Therefore, in the conventional approach, a sensing signal received by the second driving voltage which is applied to an additional driving electrode which is formed in a non-display area of the touch panel, a sensing signal received by the second driving voltage applied to the first driving electrode TX1, or virtual data may be used as a sensing signal based on the second driving voltage. However, a sensing measurement according to the conventional approach may not be accurate.

In the present invention, as illustrated in FIG. 5, in order to more accurately determine whether the 24th driving electrode TX24 is touched, during a 24th touch sensing period (Touch #24) when determining whether the 24th driving electrode TX24 is touched, the touch sensing unit 600 supplies the first driving voltage DV1 to the 24th driving electrode (TX24=TXk), and supplies the second driving voltage DV2 to the 23rd driving electrode (TX23=TXk−1).

The touch sensing unit 600 analyzes the sensing signals received from the receiving electrodes RX according to the first and second driving voltages to determine whether the 24th driving electrode TX24 is touched.

Therefore, whether the 24th driving electrode TX24 is touched is accurately determined.

The above-described details will be summarized below.

First, during an nth touch sensing period from a first touch sensing period (Touch #1) to a (k−1)th touch sensing period (Touch #k−1) included in one frame period, the touch sensing unit 600 respectively supplies the first driving voltage and the second driving voltage to the nth driving electrode and the (n+1)th driving electrode which are adjacent to each other, and determines whether the nth driving electrode from the first driving electrode TX1 to the (k−1)th driving electrode TXk−1 is touched, by using the sensing signals received from the receiving electrodes RX.

For example, during each of the first to 23rd touch sensing periods, the touch sensing unit 600 supplies the first driving voltage DV1 to the nth driving electrode, supplies the second driving voltage DV2 to the (n+1)th driving electrode, and determines whether the nth driving electrode is touched, by using the sensing signals received from the receiving electrodes RX.

Second, during the kth touch sensing period, the touch sensing unit 600 supplies the first driving voltage to the kth driving electrode, supplies the second driving voltage to the (k−1)th driving electrode, and determines whether the kth driving electrode is touched, by using the sensing signals received from the receiving electrodes RX.

For example, during a 24th touch sensing period, the touch sensing unit 600 supplies the first driving voltage to the 24th driving electrode TX24, supplies the second driving voltage to the 23rd driving electrode TX23, and determines whether the 24th driving electrode TX24 is touched, by using the sensing signals received from the receiving electrodes RX.

Figure 6:
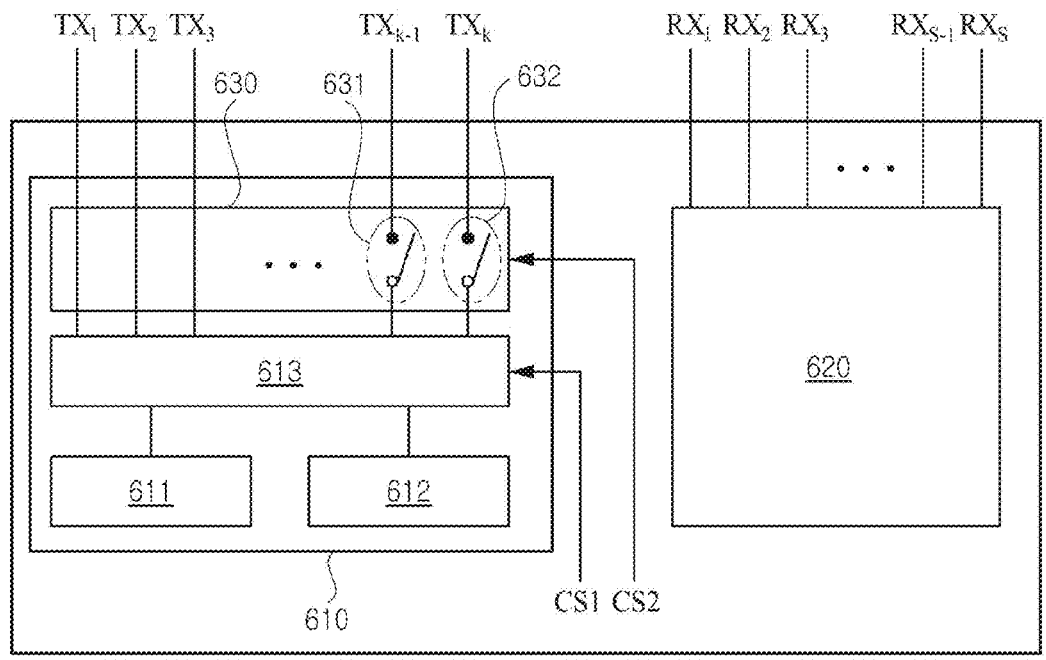
FIG. 6 is an exemplary diagram illustrating an internal configuration of a touch sensing unit applied to a display device according to a first embodiment of the present invention.
Figure 6:
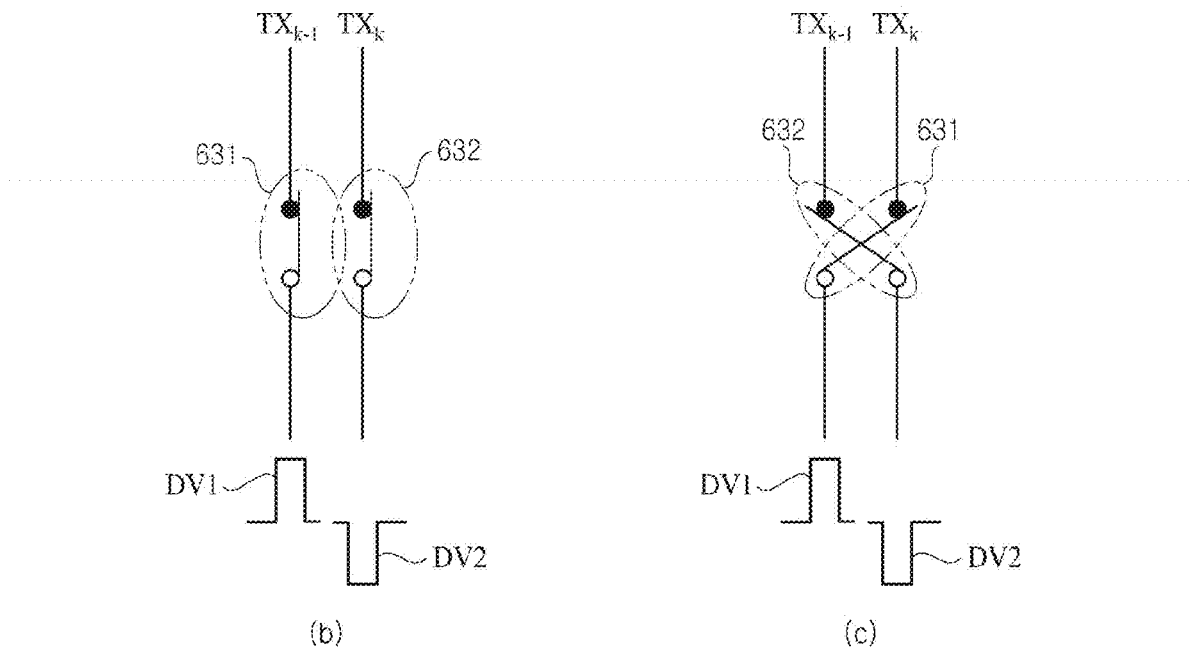

In order to perform the above-described function, as illustrated in FIG. 6, part (a), the touch sensing unit 600 includes a driver 610 which generates the first and second driving voltages and a receiver 620 which receives the sensing signals to determine whether each of the driving electrodes TX and the receiving electrodes RX is touched.

The driver 610 includes a first driving voltage generator 611 which generates the first driving voltage, a second driving voltage generator 612 which generates the second driving voltage, a connector 613 which connects the first and second driving voltage generators 611 and 612 to the driving electrodes TX according to a first control signal CS1, and a switching unit 630 which respectively supplies the first driving voltage and the second driving voltage to the kth driving electrode TXk and the (k−1)th driving electrode TXk−1 according to a second control signal CS2.

First, the connector 613 connects/disconnects the first and second driving voltage generators 611 and 612 to/from the switching unit 630 according to the first control signal CS1 generated by the timing controller 400 or the touch sensing unit 600.

For example, when the first control signal CS1 is a signal which indicates the image display period, the connector 613 disconnects the first and second driving voltage generators 611 and 612 from the switching unit 630.

When the first control signal CS1 is a signal which indicates the touch sensing period, the connector 613 connects the first and second driving voltage generators 611 and 612 to the switching unit 630.

Second, when the second control signal CS2 generated by the timing controller 400 or the touch sensing unit 600 is a signal which indicates the (k−1)th touch sensing period, as illustrated in FIG. 6, part (b), the switching unit 630 connects the (k−1)th driving electrode TXk−1 to the first driving voltage generator 611 in order for the first driving voltage to be supplied to the (k−1)th driving electrode TXk−1, and connects the kth driving electrode TXk to the second driving voltage generator 612 in order for the second driving voltage to be supplied to the kth driving electrode TXk.

When the second control signal CS2 is a signal which indicates the kth touch sensing period, as illustrated in FIG. 6, part (c), the switching unit 630 connects the (k−1)th driving electrode TXk−1 to the second driving voltage generator 612 in order for the second driving voltage DV2 to be supplied to the (k−1)th driving electrode TXk−1, and connects the kth driving electrode TXk to the first driving voltage generator 611 in order for the first driving voltage DV1 to be supplied to the kth driving electrode TXk.

In order to perform the above-described operation, as illustrated in FIG. 6, parts (a) to (c), a first switch 631 of the switching unit 630 is provided on a line connected to the first driving voltage generator 611, and a second switch 632 of the switching unit 630 is provided on a line connected to the second driving voltage generator 612.

Hereinabove, a case where the driving electrodes TX1 to TXk are formed in parallel with the gate lines GL1 to GLg formed in the panel has been described as an example of the first embodiment of the present invention. However, the driving electrodes may be formed vertically to the gate lines, in which case the receiving electrodes may be formed in parallel with the gate lines. When the driving electrodes are formed perpendicular to the gate lines, and the number "k" of the driving electrodes TX may be less than or equal to the number "s" of the receiving electrodes RX.

Hereinafter, a display device and a method of driving the same according to a second embodiment of the present invention will be described in detail with reference to FIGS. 7 to 9.

Figure 7:
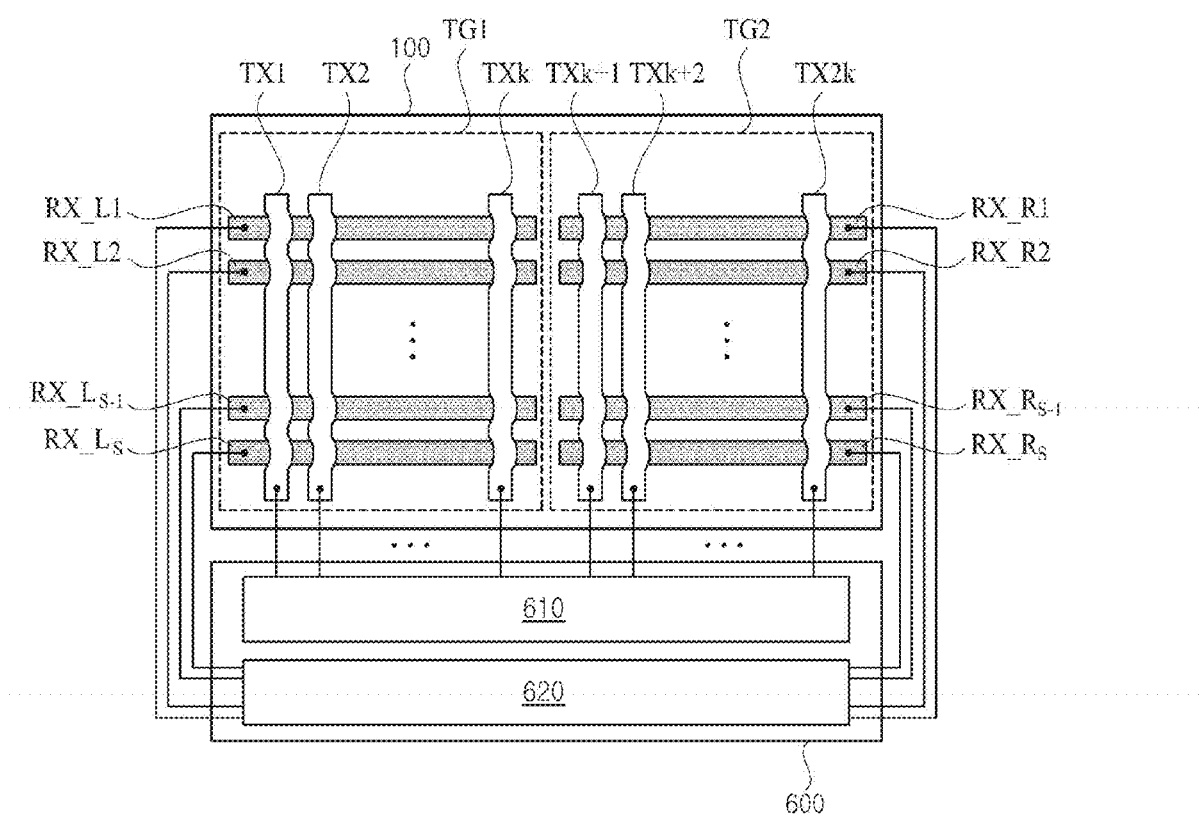
FIG. 7 is an exemplary diagram illustrating configurations of a panel and a touch sensing unit applied to a display device according to a second embodiment of the present invention.

FIG. 7 is an exemplary diagram illustrating configurations of a panel and a touch sensing unit 600 applied to a display device according to a second embodiment of the present invention. FIG. 8 is an exemplary diagram showing waveforms of driving voltages applied to a display device according to a second embodiment of the present invention. FIG. 9 is an exemplary diagram illustrating an internal configuration of a touch sensing unit 600 applied to a display device according to a second embodiment of the present invention. In the following description, detailed which are the same as or similar to the above-described details are not described or will be briefly described. In particular, the configurations of the panel drivers 200, 300 and 400 have been described above, and thus, their detailed descriptions are not provided.

The display device according to the second embodiment of the present invention, as illustrated in FIG. 7, includes: a panel 100 in which a touch panel, including a first touch electrode group TG1 in which s number of receiving electrodes RX_L1 to RX_Ls and k (which is less than s) number of driving electrodes TX1 to TXk are formed to intersect each other and a second touch electrode group TG2 in which s number of other receiving electrodes RX_R1 to RX_Rs and (k+1)th to (2k)th driving electrodes TXk+1 to TX2k are formed to intersect each other, is provided in an in-cell type, where receiving electrodes Rx_L1 to RX_Ls in the first touch electrode group TG1 and receiving electrodes Rx_R1 to RX_Rs in the second touch electrode group TG2 are electrically disconnected from each other; a touch sensing unit 600 which respectively supplies a first driving voltage DV1 and a second driving voltage DV2 to an nth (where n is a natural number which is more than one and less than k) driving electrode and an (n+1)th driving electrode in each of the first and second touch electrode groups TG1 and TG2 to determine whether the nth driving electrode is touched, and respectively supplies the first driving voltage DV1 and the second driving voltage DV2 to a kth driving electrode TXk configuring the first touch electrode group TG1 and a (k+1)th driving electrode TXk+1 configuring the second touch electrode group TG2 to determine whether the kth driving electrode TXk is touched; and a plurality of panel drivers 200, 300 and 400 which drive the panel 100 in order for the panel 100 to display an image.

In other embodiments, the touch panel may have any number of touch electrode group TG, and a number of receiving electrodes RX or driving electrodes TX may be different in each touch electrode group TG.

That is, as illustrated in FIG. 7, the panel 100 applied to the display device according to the second embodiment of the present invention includes the first touch electrode group TG1, in which the s receiving electrodes RX_L1 to RX_Ls formed in parallel with the gate lines and the k (which is less than s) driving electrodes TX1 to TX2$k$ are formed to intersect each other in one direction (a left direction in FIG. 7) of the gate lines, and the second touch electrode group TG2 in which s number of other receiving electrodes RX_R1 to RX_Rs and k number of other driving electrodes TXk+1 to TX2$k$ are formed to intersect each other in the other direction (a right direction in FIG. 7) of the gate lines. In the following description, a case in which the number of the receiving electrodes formed in each of two the touch electrode groups is 27 (e.g., s=27) and the number of the driving electrodes is 24 (e.g., k=24) will be described as an example of the present invention.

In the panel 100 applied to the second embodiment of the present invention, a long axis (an abscissa axis in FIG. 7) of the panel 100 is divided into two pieces. The first touch electrode group TG1 is formed at one side (a left side in FIG. 7) of the long axis, and the second touch electrode group TG2 is formed at the other side (a right side in FIG. 7) of the long axis.

In this case, a length of the receiving electrode RX becomes shorter. If the length of the receiving electrode RX is long, due to a parasitic capacitance generated in the panel 100, a load of the receiving electrode RX increases. For this reason, a sensing performance of the touch sensing unit 600 may be degraded.

To solve such a problem, in a large-area panel where a length of an abscissa axis becomes longer, as illustrated in FIG. 7, the receiving electrodes RX are divided into two or more groups in the abscissa axis, and the divided receiving electrodes RX are included in different touch electrode groups. In this case, the touch sensing unit 600 may separately drive the two touch electrode groups TG1 and TG2, and may drive the two touch electrode groups TG1 and TG2 so as to interoperate with each other.

Figure 8:
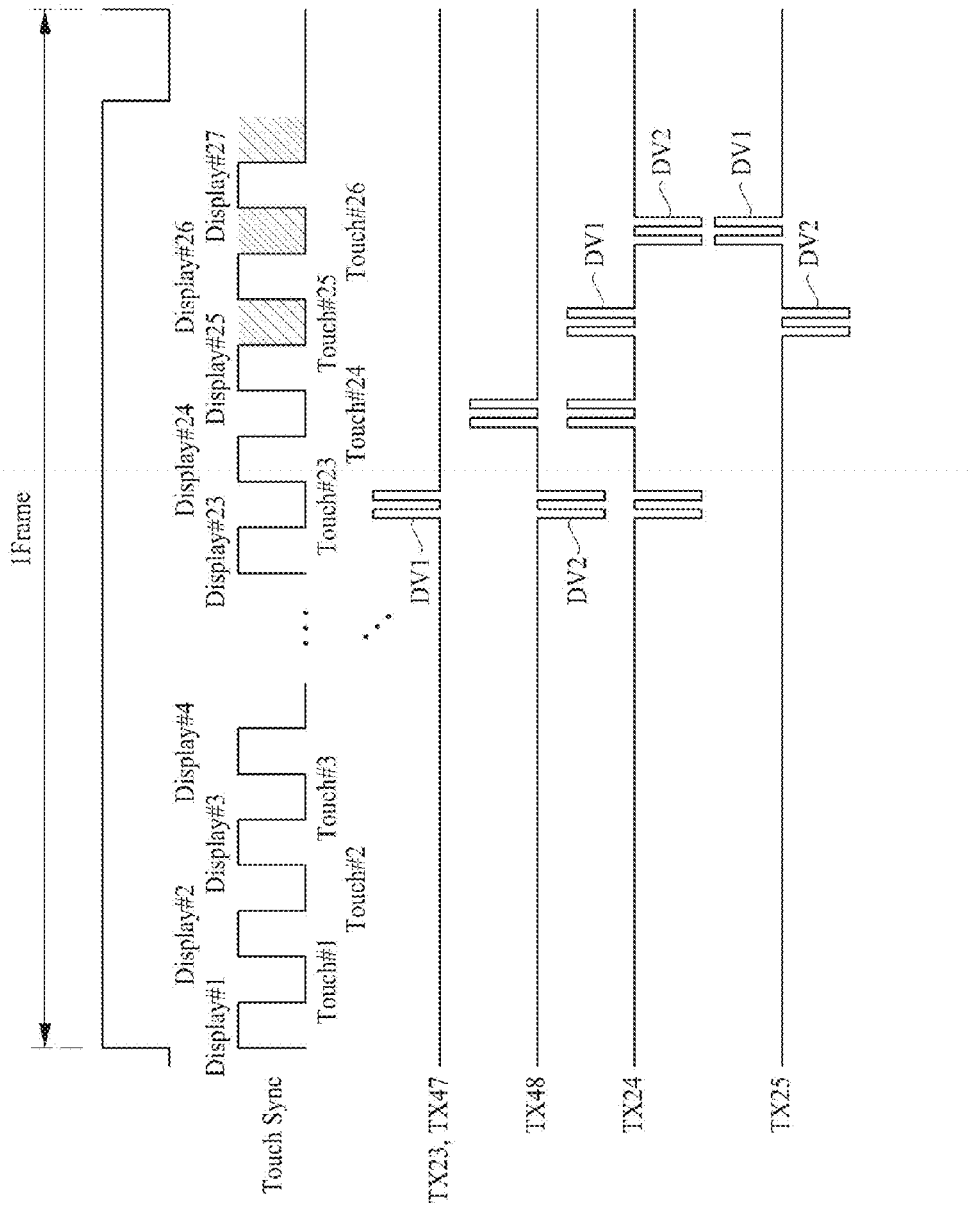
FIG. 8 is an exemplary diagram showing waveforms of driving voltages applied to a display device according to a second embodiment of the present invention.

First, in the display device and the method of driving the same according to the second embodiment of the present invention, as illustrated in FIG. 8, during an nth touch sensing period from the first touch sensing period (Touch #1) to the (k−1)th touch sensing period (Touch #k−1) included in one frame period, the touch sensing unit 600 respectively supplies the first driving voltage DV1 and the second driving voltage DV2 to the nth driving electrode and the (n+1)th driving electrode which are adjacent to each other in each of the first and second touch electrode groups TG1 and TG2, and determines whether the nth driving electrode from the first driving electrode TX1 to the (k−1)th driving electrode TXk−1 is touched, by using the sensing signals received from the receiving electrodes RX.

A method of operating the touch sensing unit 600 during the first touch sensing period (Touch #1) to the (k−1)th touch sensing period (Touch #k−1) is the same as the method, described above in the first embodiment of the present invention, of driving the touch sensing unit 600 during the first touch sensing period (Touch #1) to the (k−1)th touch sensing period (Touch #k−1).

For example, the touch sensing unit 600 respectively supplies the first driving voltage DV1 and the second driving voltage DV2 to the nth (where n is a natural number which is more than one and less than k) driving electrode and the (n+1)th driving electrode, which are adjacent to each other, to determine the nth driving electrode is touched.

For another example, when n is three, the touch sensing unit 600 respectively supplies the first driving voltage DV1 and the second driving voltage DV2 to the third driving electrode TX3 and the fourth driving electrode TX4 during the third touch sensing period (Touch #3).

The touch sensing unit 600 receives the sensing signals generated by the first and second driving voltages DV1 and DV2, from the first to 27th receiving electrodes RX1 to RX27, to determine whether the third driving electrode TX3 is touched. For example, in a case where the first and second driving voltages have the same level and different polarities, when the third driving electrode TX3 is not touched, levels or waveforms of the sensing signals received by the first and second driving voltages are substantially similar in all the receiving electrodes RX or are within a certain range. However, when the third driving electrode TX3 is touched, a sensing signal received from a receiving electrode RX which is formed in a touched area has a value which differs from a sensing signal received from a receiving electrode RX which is formed in an untouched area. Therefore, the touch sensing unit 600 may analyze the amount of change in the sensing signals to determine whether the third driving electrode TX3 is touched.

In this case, whether each of the first to 23rd driving electrodes TX1 to TX23 is touched may be determined by the above-described method.

Second, during the first touch sensing period (Touch #1) to the 23rd touch sensing period (Touch #23), whether the first to 23rd driving electrodes TX1 to TX23 of the first touch electrode group TG1 and 24th to 47th driving electrodes TX24 to TX47 of the second touch electrode group TG2 are touched may be determined by the above-described method.

However, in a conventional approach, when determining whether a 24th driving electrode TX24 which is a last driving electrode of the first touch electrode group TG1 and a 48th driving electrode TX48 which is a last driving electrode of the second touch electrode group TG2 are touched, there is no driving electrode to which the second driving voltage can be supplied to. Therefore, in a conventional approach, a sensing signal received by the second driving voltage which is applied to a separate driving electrode which is formed in a non-display area of the touch panel, a sensing signal received by the second driving voltage applied to the first driving electrode TX1, or virtual data may be used as a sensing signal based on the second driving voltage. However, a sensing measurement according to the conventional approach may not be accurate.

In the present invention, in order to more accurately determine whether the 24th driving electrode TX24 which is disposed at a boundary between the first and second touch electrode groups TG1 and TG2 and configures the first touch electrode groups TG1 is touched, during at least one touch sensing period subsequent to the kth touch sensing period among the plurality of touch sensing periods included in one frame period, the touch sensing unit 600 respectively supplies the first driving voltage DV1 and the second driving voltage DV2 to the kth driving electrode TXk configuring the first touch electrode group TG1 and the (k+1)th driving electrode TXk+1 configuring the second touch electrode group TG2 to determine whether the kth driving electrode TXk is touched, by using the sensing signals received from the receiving electrodes RX.

For example, as illustrated in FIG. 8, during the 24th touch sensing period (Touch #24), the touch sensing unit 600 supplies the first driving voltage DV1 to the 24th driving electrode TX24 configuring the first touch electrode group TG1 and the 48th driving electrode TX48 configuring the second touch electrode group TG2.

During a 25th touch sensing period (Touch #25), the touch sensing unit 600 respectively supplies the first driving voltage DV1 and the second driving voltage DV2 to the 24th driving electrode TX24 configuring the first touch electrode group TG1 and the 25th driving electrode TX25 configuring the second touch electrode group TG2 for a first measurement to determine whether the 25th driving electrode TX25 is touched, by using the sensing signals received from the receiving electrodes RX.

Therefore, whether the 24th driving electrode TX24 is touched is accurately determined.

However, the 24th driving electrode TX24 and the 25th driving electrode TX25 are included in different touch electrode groups. Therefore, the receiving electrodes RX_L1 to RX_Ls intersecting the 24th driving electrode TX24 differ from the receiving electrodes RX_R1 to RX_Rs intersecting the 25th driving electrode TX25.

For this reason, an error can occur in an operation of determining whether the 24th driving electrode TX24 is touched during the 25th touch sensing period (Touch #25).

In order to prevent an error from occurring, as illustrated in FIG. 8, during a 26th touch sensing period (Touch #26), the touch sensing unit 600 respectively supplies the second driving voltage DV2 and the first driving voltage DV1 to the 24th driving electrode TX24 and the 25th driving electrode TX25 for a second measurement to determine whether the 24th driving electrode TX24 is touched, by using the sensing signals received from the receiving electrodes RX.

In the case, the touch sensing unit 600 may finally determine whether the 24th driving electrode TX24, by using the first measurement (which is obtained through determination in the 25th touch sensing period (Touch #25)) and the second measurement which is obtained through determination in the 26th touch sensing period (Touch #26).

To provide an additional description, during at least one touch sensing period (for example, the 26th touch sensing period (Touch #26)) subsequent to the kth touch sensing period, the touch sensing unit 600 may respectively supply the second driving voltage DV2 and the first driving voltage DV1 to the kth driving electrode TXk and the (k+1)th driving electrode TXk+1 for the second measurement to determine whether the kth driving electrode TXk is touched, by using the sensing signals received from the receiving electrodes.

As described above, during the 25th touch sensing period and the 26th touch sensing period, different driving voltages are supplied to the 24th driving electrode and the 25th driving electrode to obtain two measurements, and then, whether the 24th driving electrode is touched is finally determined by using two measurements, thereby reducing an offset which occurs in the first touch electrode group TG1 and the second touch electrode group TG2.

Moreover, during at least one touch sensing period subsequent to the kth touch sensing period among the plurality of touch sensing periods included in one frame period, the touch sensing unit 600 may respectively supply the first driving voltage DV1 and the second driving voltage DV2 to the (2k)th driving electrode TX2k configuring the second touch electrode group TG2 and the (2k−1)th driving electrode TX2k−1 configuring the second touch electrode group TG2 to determine whether the (2k)th driving electrode TX2k is touched, by using the sensing signals received from the receiving electrodes RX.

As described above, whether the 24th driving electrode TX24 is touched is accurately determined by an additional determination operation which is performed during the 25th touch sensing period (Touch #25) and the 26th touch sensing period (Touch #26). However, a method of determining whether the 24th driving electrode TX24 is touched cannot be applied to the 48th driving electrode TX48.

Therefore, the touch sensing unit 600 determines whether the 48th driving electrode applied to the second embodiment of the present invention is touched, by using a method applied to the first embodiment of the present invention.

That is, during at least one touch sensing period (for example, a 27th touch sensing period (Touch #27) in FIG. 8) subsequent to the kth touch sensing period among the plurality of touch sensing periods included in one frame period, the touch sensing unit 600 may respectively supply the first driving voltage DV1 and the second driving voltage DV2 to the 48th driving electrode TX48 configuring the second touch electrode group TG2 and the 47th driving electrode TX47 configuring the second touch electrode group TG2 to determine whether the 48th driving electrode TX48 is touched, by using the sensing signals received from the receiving electrodes configuring the second touch electrode group TG2.

Through the above-described operations, whether all the electrodes configuring the first and second touch electrode groups TG1 and TG2 are touched is accurately determined.

The above-described details of the present invention will be summarized below.

The number of the receiving electrodes RX configuring the first touch electrode group TG1 may be the same as the number of the receiving electrodes RX configuring the second touch electrode group TG2, and the number of the driving electrodes TX configuring the first touch electrode group TG1 may be the same as the number of the driving electrodes TX configuring the second touch electrode group TG2. In one aspect, nth driving electrode from the driving electrode TX1 to TXk−1 in a first touch electrode group TG1 and nth driving electrode from the driving electrodes TXk+1 to TX2k−1 in a second touch electrode group TG2 may be sensed together. In this case, in each of the first and second touch electrode groups TG1 and TG2, the number "s" of the receiving electrodes may be more than the number "k" of the driving electrodes.

In the present invention, whether the kth driving electrode TXk, which configures the first touch electrode group TG1) is touched may be additionally determined during a plurality of touch sensing periods equal to a number corresponding to "s−k". Also, whether the (2k)th driving electrode TX2k configuring the second touch electrode group TG2 is touched may be additionally determined.

For example, when s is 30 and k is 24, a total of six additional touch sensing periods may be used to sense touches on the 24th driving electrode TK24 and/or the 48th driving electrode TX48.

Therefore, during the remaining six touch sensing periods, the touch sensing unit 600 may additionally determine whether the kth driving electrode TXk is touched. In this case, during the 24th touch sensing period (Touch #24), the touch sensing unit 600 may respectively supply the first driving voltage DV1 and the second driving voltage DV2 to the 24th driving electrode TX24 and the 25th driving electrode TX25 to determine whether the 24th driving electrode TX24 is touched. However, during the 24th touch sensing period, since the first driving voltage DV1 may be supplied to the 48th driving electrode TX48, whether the 24th driving electrode TX24 is touched may be substantially determined during the 25th touch sensing period.

However, when an operation of determining whether the 48th driving electrode TX48 is touched is performed by the above-described additional method, whether the 24th driving electrode TX24 is touched may be determined during the 24th touch sensing period.

Moreover, in order to increase an accuracy of determining whether the 24th driving electrode TX24 is touched, an operation of respectively supplying the second driving voltage DV2 and the first driving voltage DV1 to the 24th driving electrode TX24 and the 25th driving electrode TX25 may be additionally performed.

Moreover, as described above, during the remaining six touch sensing periods, the touch sensing unit 600 may additionally determine whether the 24th driving electrode TX24 is touched, and then may additionally determine whether the 48th driving electrode TX48 is touched.

Moreover, during the remaining six touch sensing periods, the touch sensing unit 600 may additionally perform an operation of whether a plurality of driving electrodes TX for which determination of a touch is additionally needed, in addition to the 24th and 48th driving electrodes, are touched.

In this case, during the remaining touch sensing periods, information about a plurality of driving electrodes TX for which a touch is additionally determined may be stored in the touch sensing unit 600 or the timing controller 400.

That is, the touch sensing unit 600 collects information about a plurality of driving electrodes TX, for which determination of a touch is additionally needed, from the information stored in the touch sensing unit 600 or the timing controller 400. Subsequently, during the remaining touch sensing periods, the touch sensing unit 600 determines whether the driving electrodes TX are touched.

Figure 9:
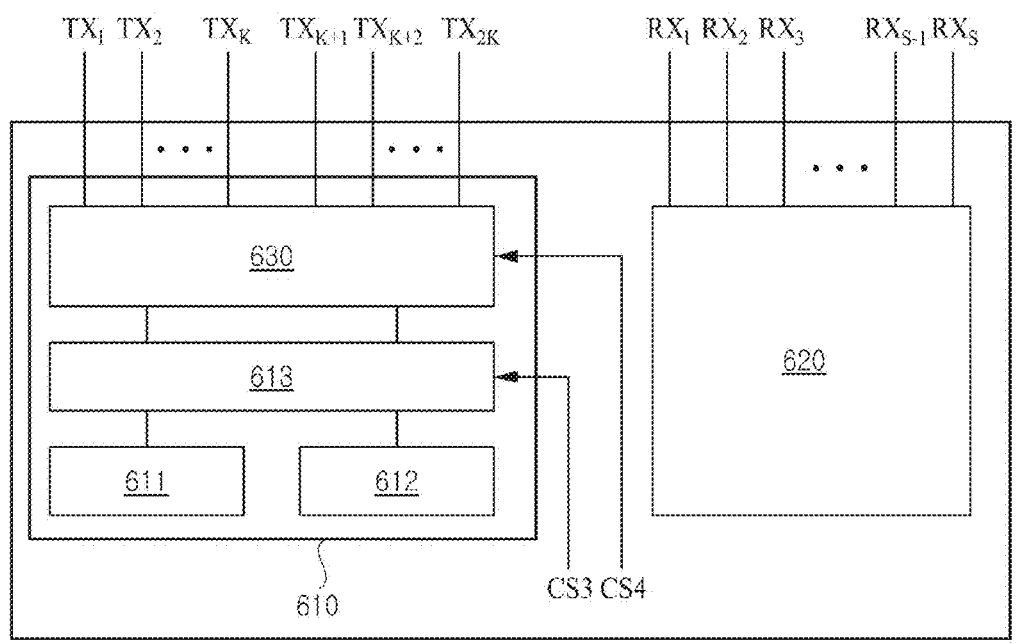
FIG. 9 is an exemplary diagram illustrating an internal configuration of a touch sensing unit applied to a display device according to a second embodiment of the present invention.

In order to perform the above-described function, as illustrated in FIG. 9, the touch sensing unit 600 includes a driver 610, which generates the first and second driving voltages DV1 and DV2, and a receiver 620 which receives the sensing signals to determine whether each of the driving electrodes TX and the receiving electrodes RX is touched.

The driver 610 includes a first driving voltage generator 611 which generates the first driving voltage DV1, a second driving voltage generator 612 which generates the second driving voltage DV2, a connector 613 which connects the first and second driving voltage generators 611 and 612 to the driving electrodes TX according to a third control signal CS3, and a switching unit 630 which respectively supplies the first driving voltage DV1 and the second driving voltage DV2 to the kth driving electrode TX$k$ and the (k+1)th driving electrode TX$k$+1 according to a fourth control signal CS4.

First, the connector 613 connects/disconnects the first and second driving voltage generators 611 and 612 to/from the switching unit 630 according to the third control signal CS3 generated by the timing controller 400 or the touch sensing unit 600.

For example, when the third control signal CS3 is a signal which indicates the image display period, the connector 613 disconnects the first and second driving voltage generators 611 and 612 from the switching unit 630.

When the third control signal CS3 is a signal which indicates the touch sensing period, the connector 613 connects the first and second driving voltage generators 611 and 612 to the switching unit 630.

Second, when the fourth control signal CS4 generated by the timing controller 400 or the touch sensing unit 600 is a signal which indicates the (k+1)th touch sensing period, the switching unit 630 connects the kth driving electrode TX$k$ to the first driving voltage generator 611 in order for the first driving voltage DV1 to be supplied to the kth driving electrode TX$k$, and connects the (k+1)th driving electrode TX$k$+1 to the second driving voltage generator 612 in order for the second driving voltage DV2 to be supplied to the (k+1)th driving electrode TX$k$+1.

When the second control signal CS2 is a signal which indicates a (k+2)th touch sensing period, the switching unit 630 connects the kth driving electrode TX$k$ to the second driving voltage generator 612 in order for the second driving voltage DV2 to be supplied to the kth driving electrode TX$k$, and connects the (k+1)th driving electrode TX$k$+1 to the first driving voltage generator 611 in order for the first driving voltage DV1 to be supplied to the (k+1)th driving electrode TX$k$+1.

Moreover, when the second control signal CS2 is a signal indicating a touch sensing period which is set so as to determine whether the (2k)th driving electrode TX2$k$ is touched, the switching unit 630 connects the (2k)th driving electrode TX2$k$ to the first driving voltage generator 611 in order for the first driving voltage DV1 to be supplied to the (2k)th driving electrode TX2$k$, and connects the (2k−1)th driving electrode TX2$k$−1 to the second driving voltage generator 612 in order for the second driving voltage DV2 to be supplied to the (2k−1)th driving electrode TX2$k$−1.

That is, the switching unit 630 performs a function that connects the first and second driving voltage generators 611 and 612 to the driving electrodes TX according to the second control signal CS2.

A method of driving a display device according to embodiments of the present invention will be briefly summarized below.

A method of driving a display device according to a first embodiment of the present invention includes: respectively supplying a first driving voltage and a second driving voltage to s number of receiving electrodes, which are formed in the touch panel which is provided in an in-cell type in the panel 100, and an nth (where n is a natural number which is more than one and less than k) driving electrode and an (n+1)th driving electrode, which are adjacent to each other among k (which is less than s) number of driving electrodes which are formed to intersect the receiving electrodes in the touch panel, to determine whether the nth driving electrode is touched; and respectively supplying the first driving voltage and the second driving voltage to a kth driving electrode and a (k−1)th driving electrode to determine whether the kth driving electrode TX$k$ is touched.

A method of driving a display device according to a second embodiment of the present invention includes: respectively supplying a first driving voltage and a second driving voltage to an nth (where n is a natural number which is more than one and less than k) driving electrode and an (n+1)th driving electrode which are adjacent to each other in each of a first touch electrode group TG1, in which s number of receiving electrodes and k (which is less than s) number of driving electrodes are formed to intersect each other which are formed in the touch panel which is provided in an in-cell type in the panel 100, and a second touch electrode group TG2, in which s number of other receiving electrodes and (k+1)th to (2k)th driving electrodes are formed to intersect each other in the touch panel, where receiving electrodes in the first touch electrode group are electrically disconnected from said other receiving electrodes in the second touch electrode group; and respectively supplying a kth driving electrode configuring the first touch electrode group TG1 and a (k+1)th driving electrode configuring the second touch electrode group TG2 to determine whether the kth driving electrode TXk is touched.

According to the embodiments of the present invention, a touch sensitivity of a driving electrode which is formed at a lowermost portion of the panel among the driving electrodes formed in parallel with the gate lines of the panel can be enhanced.

Moreover, according to the embodiments of the present invention, a touch sensitivity of a boundary area in which two touch electrode groups are adjacent to each other can be enhanced.

Moreover, according to the embodiments of the present invention, the number of parasitic capacitance of the touch panel can be reduced, and thus, touch performance can be enhanced. Accordingly, a touch panel may be built into, in an in-cell type, a panel applied to a large-area display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a touch panel including s number of receiving electrodes and k number of driving electrodes which are formed to intersect the receiving electrodes, k being less than s and larger than 2, the touch panel provided in an in-cell type; and
a touch sensing unit configured to (i) supply a first driving voltage to an nth driving electrode and (ii) supply a second driving voltage different from the first driving voltage to an (n+1)th driving electrode while the first driving voltage is supplied to the nth driving electrode, the nth driving electrode and the (n+1) driving electrode being adjacent to each other among the driving electrodes, to determine whether the nth driving electrode is touched, n being a natural number which is more than one and less than k, the touch sensing unit further configured to (i) supply the first driving voltage to a kth driving electrode and (ii) supply the second driving voltage to a (k−1)th driving electrode while the first driving voltage is supplied to the kth driving electrode to determine whether the kth driving electrode is touched.

2. The display device of claim 1, wherein the driving electrodes are formed in parallel with a plurality of gate lines formed in the touch panel.

3. The display device of claim 1, wherein,
during a touch sensing period from a first touch sensing period to a (k−1)th touch sensing period included in one frame period, the touch sensing unit respectively supplies the first driving voltage and the second driving voltage to the nth driving electrode and the (n+1)th driving electrode which are adjacent to each other, and determines whether the nth driving electrode is touched, by using a plurality of sensing signals received from the receiving electrodes, and
during a kth touch sensing period, the touch sensing unit supplies the first driving voltage to the kth driving electrode, supplies the second driving voltage to the (k−1)th driving electrode, and determines whether the kth driving electrode is touched, by using the plurality of sensing signals received from the receiving electrodes.

4. A display device comprising:
a touch panel including a first touch electrode group in which s number of receiving electrodes and k number of driving electrodes are formed to intersect each other and a second touch electrode group in which s number of other receiving electrodes and (k+1)th to (2k)th driving electrodes are formed to intersect each other, k being less than s, the touch panel provided in an in-cell type, the receiving electrodes in the first touch electrode group electrically disconnected from said other receiving electrodes in the second touch electrode group; and
a touch sensing unit configured to (i) supply a first driving voltage to an nth driving electrode of the first touch electrode group and (ii) supply a second driving voltage different from the first driving voltage to an (n+1)th driving electrode of the first touch electrode group while the first driving voltage is supplied to the nth driving electrode of the first touch electrode group to determine whether the nth driving electrode of the first touch electrode group is touched, n being a natural number less than k, the touch sensing unit further configured to (i) supply the first driving voltage to a kth driving electrode of the first touch electrode group and (ii) supply the second driving voltage to a (k+1)th driving electrode of the second touch electrode group while the first driving voltage is supplied to the kth driving electrode of the first touch electrode group to determine whether the kth driving electrode of the first touch electrode group is touched.

5. The display device of claim 4, wherein the receiving electrodes are formed in parallel with a plurality of gate lines formed in the touch panel.

6. The display device of claim 4, wherein,
during a touch sensing period from a first touch sensing period to a (k−1)th touch sensing period included in one frame period, the touch sensing unit respectively supplies the first driving voltage and the second driving voltage to the nth driving electrode and the (n+1)th driving electrode which are adjacent to each other in each of the first and second touch electrode groups, determines whether the nth driving electrode in the first touch electrode group is touched by using a plurality of sensing signals received from the receiving electrodes in the first touch electrode group, and determines whether the nth driving electrode in the second touch electrode group is touched by using a plurality of sensing signals received from said other receiving electrodes in the second touch electrode group, and
during at least one touch sensing period subsequent to a kth touch sensing period among a plurality of touch sensing periods included in one frame period, the touch sensing unit respectively supplies the first driving voltage and the second driving voltage to the kth driving electrode configuring the first touch electrode group and the (k+1)th driving electrode configuring the second touch electrode group to determine whether the kth driving electrode is touched, by using the plurality of sensing signals received from the receiving electrodes in the first touch electrode group and said other receiving electrodes in the second touch electrode group.

7. The display device of claim 6, wherein during at least one touch sensing period subsequent to the kth touch sensing period, the touch sensing unit respectively supplies the second driving voltage and the first driving voltage to the kth driving electrode and the (k+1)th driving electrode to determine whether the kth driving electrode is touched, by using the plurality of sensing signals received from the receiving electrodes in the first touch electrode group and said other receiving electrodes in the second touch electrode group.

8. The display device of claim 4, wherein during at least one touch sensing period subsequent to a kth touch sensing period among a plurality of touch sensing periods included in one frame period, the touch sensing unit respectively supplies the first driving voltage and the second driving voltage to the (2k)th driving electrode configuring the second touch electrode group and a (2k−1)th driving electrode configuring the second touch electrode group to determine whether the (2k)th driving electrode is touched, by using a plurality of sensing signals received from said other receiving electrodes in the second touch electrode group.

9. A method of driving a display device, the method comprising:
supplying a first driving voltage to an nth driving electrode and supplying a second driving voltage different from the first driving voltage to an (n+1)th driving electrode while the first driving voltage is supplied to the nth driving electrode, the nth driving electrode and the (n+1) driving electrode being adjacent to each other among k number of driving electrodes which are formed to intersect s number of receiving electrodes, which are formed in a touch panel which is provided in an in-cell type in a panel, to determine whether the nth driving electrode is touched, k being less than s and larger than 2, n being a natural number which is more than one and less than k; and
supplying the first driving voltage to a kth driving electrode and supplying the second driving voltage to a (k−1)th driving electrode while the first driving voltage is supplied to the kth driving electrode to determine whether the kth driving electrode is touched.

10. A method of driving a display device, the method comprising:
supplying a first driving voltage to an nth driving electrode and supplying a second driving voltage different from the first driving voltage to an (n+1)th driving electrode while the first driving voltage is supplied to the nth driving electrode, the nth driving electrode and the (n+1) driving electrode being adjacent to each other in each of a first touch electrode group and a second touch electrode group, the first touch electrode group having s number of receiving electrodes and k number of driving electrodes to intersect each other which are formed in a touch panel, k being less than s and n being a natural number less than k, and the second touch electrode group having s number of other receiving electrodes and (k+1)th to (2k)th driving electrodes to intersect each other in the touch panel, the receiving electrodes in the first touch electrode group electrically disconnected from said other receiving electrodes in the second touch electrode group; and
supplying the first driving voltage to a kth driving electrode of the first touch electrode group and supplying the second driving voltage to a (k+1)th driving electrode of the second touch electrode group while the first driving voltage is supplied to the kth driving electrode of the first touch electrode group to determine whether the kth driving electrode of the first touch electrode group is touched.

11. A display device comprising:
a touch panel including receiving electrodes and driving electrodes including at least a first driving electrode, a second driving electrode, and a third driving electrode, the receiving electrodes intersecting the first, second, and third driving electrodes; and
a touch sensing unit configured to:
(i) supply a first driving voltage to the first driving electrode and (ii) supply a second driving voltage different from the first driving voltage to the second driving electrode while the first driving voltage is supplied to the first driving voltage to determine whether the first driving electrode is touched, the second driving electrode being adjacent to the first driving electrode,
(i) supply the first driving voltage to the second driving electrode and (ii) supply the second driving voltage to the third driving electrode while the first driving voltage is supplied to the second driving electrode to determine whether the second driving electrode is touched, the third driving electrode being adjacent to the second driving electrode, and
(i) supply the first driving voltage to the third driving electrode and (ii) supply the second driving voltage to the second driving electrode while the first driving voltage is supplied to the third driving electrode to determine whether the third driving electrode is touched.

12. The display device of claim 11, wherein the third driving electrode is positioned nearest to an edge of the touch panel among the driving electrodes.

13. The display device of claim 11, wherein:
the touch panel includes first receiving electrodes and second receiving electrodes electrically disconnected from the first receiving electrodes,
the touch panel further includes a fourth driving electrode and a fifth driving electrode, the fourth driving electrode intersecting with the first receiving electrodes and the fifth driving electrode intersecting with the second receiving electrodes, and
the touch sensing unit is further configured to (i) supply the first driving voltage to the fourth driving electrode and (ii) supply the second driving voltage to the fifth driving electrode while the first driving voltage is supplied to the fourth driving electrode for a first measurement to determine whether the fourth driving electrode is touched, the fifth driving electrode adjacent to the fourth driving electrode.

14. The display device of claim 13, wherein the touch sensing unit is further configured to (i) supply the second driving voltage to the fourth driving electrode and (ii) supply the first driving voltage to the fifth driving electrode while the second driving voltage is supplied to the fourth driving electrode for a second measurement, the first measurement and the second measurement being combined to determine whether the fourth driving electrode is touched.

15. The display device of claim 13, wherein a number of driving electrodes intersecting the first receiving electrodes is equal to a number of driving electrodes intersecting the second receiving electrodes.

16. A method of driving a touch panel, the method comprising:
supplying a first driving voltage to a first driving electrode and supplying a second driving voltage different from the first driving voltage to a second driving electrode while the first driving voltage is supplied to the first driving electrode to determine whether the first driving electrode is touched, the second driving electrode being adjacent to the first driving electrode, supplying the first driving voltage to the second driving electrode and supplying the second driving voltage to a third driving electrode while the first driving electrode is supplied to the second driving electrode to determine whether the second driving electrode is touched, the third driving electrode being adjacent to the second driving electrode, and supplying the first driving voltage to the third driving electrode and supplying the second driving voltage to the second driving electrode while the first driving voltage is supplied to the third driving electrode to determine whether the third driving electrode is touched, the first, second and third driving electrodes intersecting receiving electrodes.

17. The method of claim 16, wherein the third driving electrode is positioned nearest to an edge of the touch panel among the driving electrodes.

18. The method of claim 16, further comprising:

supplying the first driving voltage to a fourth driving electrode and supplying the second driving voltage to a fifth driving electrode while the first driving voltage is supplied to the fourth driving electrode for a first measurement to determine whether the fourth driving electrode is touched, the fifth driving electrode adjacent to the fourth driving electrode, the fourth driving electrode intersecting first receiving electrodes and the fifth driving electrode intersecting second receiving electrodes.

19. The method of claim 18, further comprising:

supplying the second driving voltage to the fourth driving electrode and supplying the first driving voltage to the fifth driving electrode while the second driving voltage is supplied to the fourth driving electrode for a second measurement; and determining whether the fourth driving electrode is touched based on the first measurement and the second measurement.

20. The method of claim 18, further comprising:

determining whether another driving electrode intersecting the first receiving electrodes is touched in a time period; and determining whether at least one driving electrode intersecting the second receiving electrodes is touched in the time period.

21. The method of claim 18, wherein the first driving voltage and the second driving voltage have different phases.

* * * * *